(12) United States Patent
Koike

(10) Patent No.: US 10,370,049 B2
(45) Date of Patent: Aug. 6, 2019

(54) MOLDING STRUCTURE FOR AUTOMOTIVE GLASS

(71) Applicant: TOYOTA JIDOSHA KABUSHIKI KAISHA, Toyota-shi, Aichi-ken (JP)

(72) Inventor: Hiroyuki Koike, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/800,206

(22) Filed: Nov. 1, 2017

(65) Prior Publication Data

US 2018/0141601 A1 May 24, 2018

(30) Foreign Application Priority Data

Nov. 24, 2016 (JP) ................. 2016-228151

(51) Int. Cl.
*B62D 65/06* (2006.01)
*B29C 45/14* (2006.01)
(Continued)

(52) U.S. Cl.
CPC ........ *B62D 65/06* (2013.01); *B29C 45/14336* (2013.01); *B29C 45/14377* (2013.01); *B29C 45/14434* (2013.01); *B29C 45/2608* (2013.01); *B29C 45/345* (2013.01); *B60J 1/02* (2013.01); *B60J 1/10* (2013.01); *C03C 27/04* (2013.01); *B29C 2045/2697* (2013.01); *B29C 2045/2733* (2013.01); *B29C 2045/2889* (2013.01)

(58) Field of Classification Search
CPC .............. B62D 25/06; B29C 45/14434; B29C 45/2608; B29C 45/345; B60J 1/02; C03C 27/04

USPC .................................................. 296/146.15
See application file for complete search history.

(56) References Cited

U.S. PATENT DOCUMENTS 4,487,448 A * 12/1984 Griffin .................... B60J 1/006
296/146.15
2008/0073939 A1 3/2008 Arai et al.
(Continued)

FOREIGN PATENT DOCUMENTS

JP 2004-268707 9/2004
JP 2007-125936 A 5/2007
(Continued)

*Primary Examiner* — Joseph D. Pape
(74) *Attorney, Agent, or Firm* — Oblon, McClelland, Maier & Neustadt, L.L.P.

(57) ABSTRACT

Rear quarter glass has a glass plate, a plastic molding, and a metal molding. A retainer is arranged between the plastic molding and the metal molding. The retainer has a first through-hole and a pin portion. The metal molding has a projecting portion that is inserted through the first through-hole. The projecting portion has an end section that projects from the first through-hole in a state inserted through the first through-hole. The plastic molding has a second through-hole through which the pin portion is inserted. The pin portion has an end section that projects from the second through-hole in a state inserted through the second through-hole. The end section of the projecting portion is swaged to the retainer by swaging through thermal deformation. The end section of the pin portion is swaged to the plastic molding by swaging through thermal deformation.

6 Claims, 3 Drawing Sheets

(51) Int. Cl.
  *B29C 45/26* (2006.01)
  *B29C 45/34* (2006.01)
  *B60J 1/02* (2006.01)
  *C03C 27/04* (2006.01)
  *B60J 1/10* (2006.01)
  *B29C 45/27* (2006.01)
  *B29C 45/28* (2006.01)

(56) References Cited

U.S. PATENT DOCUMENTS

2012/0045608 A1* 2/2012 Huchet .............. B60R 13/0206
  428/99
2015/0258876 A1* 9/2015 Kondo .................... B60R 13/04
  296/146.15

FOREIGN PATENT DOCUMENTS

| JP | 2008-080917 | 4/2008 |
| JP | 2013-188967 | 9/2013 |

* cited by examiner

MOLDING STRUCTURE FOR AUTOMOTIVE GLASS

BACKGROUND OF THE INVENTION

The present invention relates to a molding structure for automotive glass.

A type of automotive glass has been known that includes a plastic molding arranged along a peripheral edge of a glass and a metal molding arranged on a surface of the plastic molding for decoration. For example, as described in Japanese Laid-Open Patent Publication No. 2013-188967, a window glass having moldings is formed by arranging a metal molding and a glass plate in a cavity of a metal mold and injecting molten plastic into the cavity to join the metal molding, a plastic molding, and the glass plate as an integral body.

As has been described, at the time of molding the plastic molding, the metal molding is arranged directly in the metal mold. This may cause scratches on the decorative surface of the metal molding through contact between the metal molding and the metal mold.

SUMMARY OF THE INVENTION

Accordingly, it is an objective of the present invention to provide a molding structure for automotive glass capable of restraining scratches on a decorative surface of a metal molding in a manufacturing process.

To achieve the foregoing objective and in accordance with a first aspect of the present invention, a molding structure is provided that is employed in automotive glass having a glass plate, a plastic molding arranged along a peripheral edge of the glass plate through integral molding, and a cast metal molding arranged in the plastic molding. The molding structure includes a retainer that is arranged between the plastic molding and the metal molding and fixed to the plastic molding and the metal molding.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A molding structure for automotive glass according to one embodiment of the present invention will now be described with reference to FIGS. 1 to 5. The terms front and rear refer to the front and rear of a vehicle, and the terms up and down refer to up and down in the vertical direction.

Figure 1:
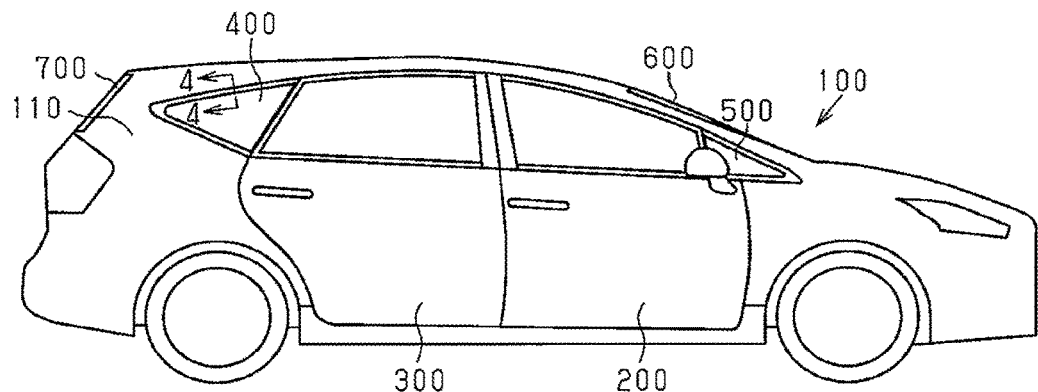
FIG. 1 is a side view showing a vehicle including automotive glass employing a molding structure according to one embodiment.

As shown in FIG. 1, a vehicle 100 includes a front side door 200 and a rear side door 300. The vehicle 100 also includes a side-member outer panel 110, which mainly configures an outer plate of a rear section of a side surface of the vehicle body. Rear quarter glass 400, which configures automotive glass, is fixed to the side-member outer panel 110. The rear quarter glass 400 has moldings along a peripheral edge of the rear quarter glass 400. The rear quarter glass 400 is formed substantially in a triangular shape. A rear corner section of the rear quarter glass 400 is curved in an arcuate shape.

Figure 2:
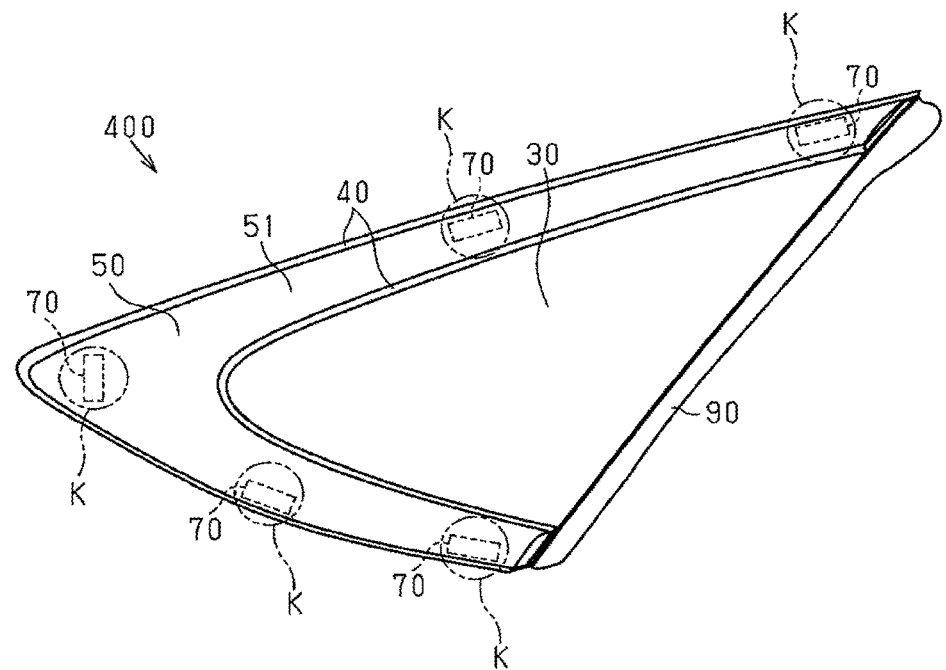
FIG. 2 is a plan view showing the automotive glass.

As shown in FIG. 2, the rear quarter glass 400 includes a glass plate 30, which is formed substantially in a triangular shape, a seal lip 90, a plastic molding 40, and a metal molding 50. The seal lip 90 is attached to a front edge section of the glass plate 30 and held in tight contact with a rear edge section of the rear side door 300. The plastic molding 40 is arranged along a peripheral edge of the glass plate 30 through integral molding. The metal molding 50 is attached to the surface of the plastic molding 40 to decorate the plastic molding 40. The plastic molding 40 is made of polyvinyl chloride. The plastic molding 40 may be made of any other plastic, such as urethane plastic or silicone plastic.

The metal molding 50 is a cast product and manufactured by injection molding using zinc alloy as material. The surface of the metal molding 50 visible from the exterior of the vehicle is a decorative surface 51. The metal molding 50 may be manufactured using any metal different from zinc alloy, such as metal including aluminum alloy or magnesium alloy. Also, the metal molding 50 may be cast using any publicly known method different from injection molding.

The metal molding 50 and the plastic molding 40 are fixed to each other by means of retainers 70, each of which is arranged between the metal molding 50 and the plastic molding 40. The rear quarter glass 400 has multiple fixing positions K, at which the metal molding 50 and the plastic molding 40 are fixed to each other by means of the retainers 70. Each retainer 70 is made of thermoplastic resin such as AES plastic.

Figure 3:
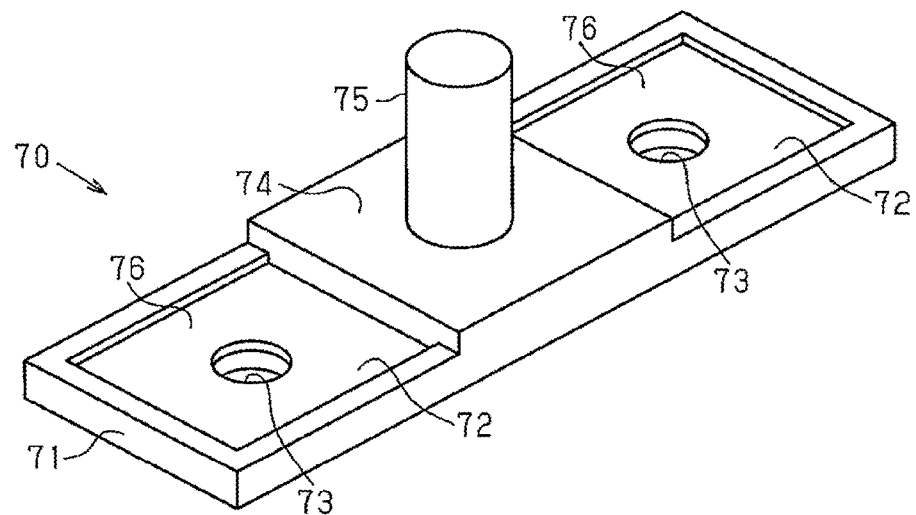
FIG. 3 is a perspective view showing a retainer.

As shown in FIG. 3, each retainer 70 includes a plate-shaped base portion 71. A substantially rectangular seat portion 74 is formed in the middle of the base portion 71. A rod-shaped pin portion 75, which projects perpendicular to the seat portion 74, is formed at the center of the seat portion 74.

Flat plate-shaped metal plates 72, which are made of stainless steel, are cast in the base portion 71. The metal plates 72 are exposed from corresponding surfaces of the base portion 71, which are located on opposite sides of the seat portion 74. The base portion 71 thus has exposure surfaces 76 for the metal plates 72 on the opposite sides of the seat portion 74. A through-hole 73 is formed at the center of each exposure surface 76, serving as a first through-hole extending through the base portion 71 and the corresponding metal plate 72. The metal plates 72 may be made of any metal other than stainless steel.

Figure 4:
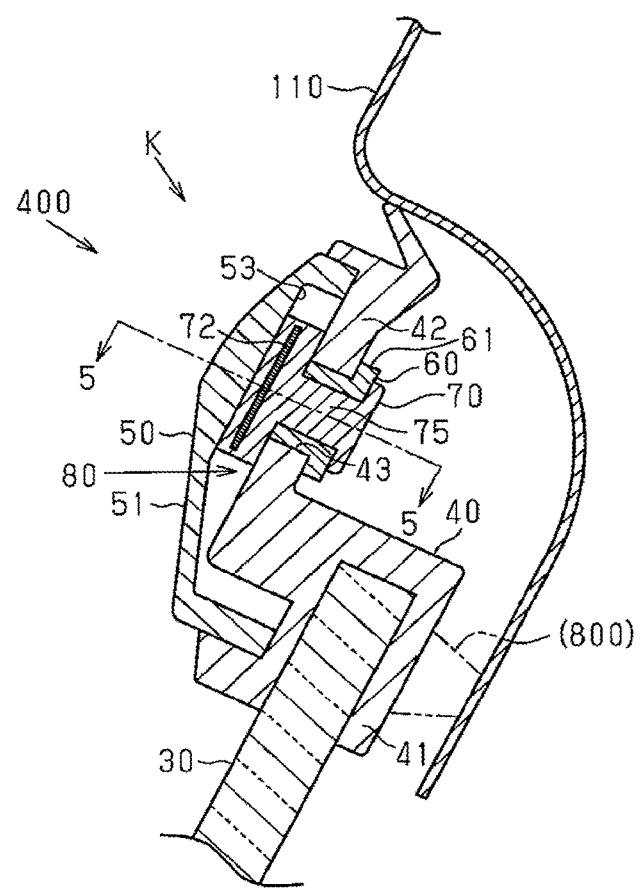
FIG. 4 is a cross-sectional view taken along line 4-4 of FIG. 1.

As shown in FIG. 4, the plastic molding 40 includes a glass holding portion 41, which is arranged along the peripheral edge of the glass plate 30 through integral molding, and retainer fixing portions 42, each of which is formed above the glass holding portion 41. Each of the retainers 70 is fixed to the corresponding one of the retainer fixing portions 42. The glass holding portion 41 is fixed to the side-member outer panel 110 using adhesive 800.

Figure 5:
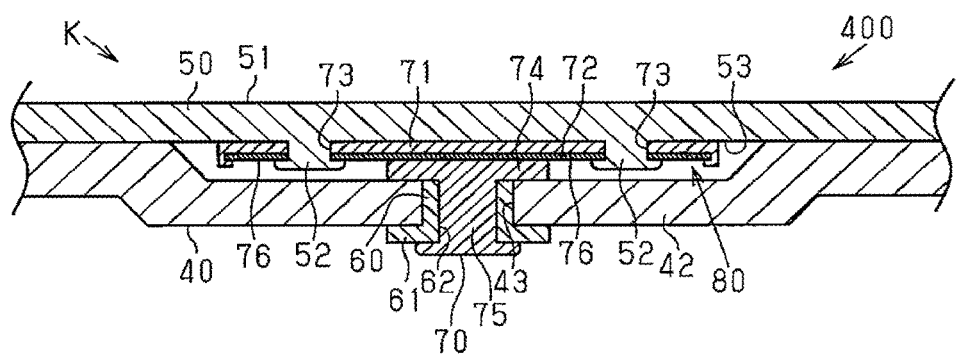
FIG. 5 is a cross-sectional view taken along line 5-5 of FIG. 4.

As shown in FIGS. 4 and 5, a space 80 is defined between a back face 53 of the decorative surface 51 of the metal molding 50 and each retainer fixing portion 42. Each of the spaces 80 accommodates a base portion 71 of the corresponding one of the retainers 70.

As shown in FIG. 5, at each of the fixing positions K, two rod-shaped projecting portions 52 project from the back face 53 of the metal molding 50. The projecting portions 52 are formed integrally with the metal molding 50. Each of the projecting portions 52 is inserted through a corresponding one of through-holes 73 of the base portion 71 from the back side of the exposure surface 76. An end section of each projecting portion 52 projects from the corresponding through-hole 73 to the front side of the exposure surface 76. Swaging through thermal deformation is performed on the end section of each projecting portion 52. The end section of the projecting portion 52 is thus swaged to the corresponding metal plate 72. More specifically, spin swaging is performed on the end sections of the projecting portions 52 using a spin swaging machine. The spin swaging fixes the base portions 71 of the retainers 70 to the back face 53 of the metal molding 50. In the spin swaging, a rotating spindle is pressed against the end section of each projecting portion 52. The end section of the projecting portion 52 is then melted by friction heat produced by the spindle. The end section of the projecting portion 52 is thus deformed in a shape such as a disk-shaped shape or a semispherical shape and then cooled to be swaged.

A through-hole 43 is formed in each retainer fixing portion 42, serving as a second through-hole that opens toward the seat portion 74 of the corresponding retainer 70. A tubular bushing 60 is inserted through each of the through-holes 43. Each of the bushings 60 has a through-hole 62, which is coaxial with the bushing 60. Each bushing 60 has a flange 61, which extends in a radial direction of the bushing 60, at one of opposite opening ends of the bushing 60 on the opposite side to the base portion 71.

The pin portion 75 of each retainer 70 is inserted through the through-hole 62 of the corresponding bushing 60. The pin portion 75 is inserted from one of the opposite opening ends of the bushing 60 on the opposite side to the flange 61 to project from the through-hole 62. Swaging through thermal deformation is performed on the end section of the pin portion 75 projecting from the through-hole 62. The end section of the pin portion 75 is thus swaged to the flange 61 of the bushing 60. More specifically, heat swaging is performed on the end section of each pin portion 75 using a heat swaging machine. The heat swaging fixes the pin portion 75 of each retainer 70 to the corresponding retainer fixing portion 42, which includes the bushing 60. The heat swaging is also a publicly known swaging method. Specifically, the end section of each pin portion 75 is melted using a punch or the like, which has been heated by a heater. The end section of the pin portion 75 is thus deformed in a shape such as a disk-shaped shape or a semispherical shape and then cooled to be swaged. In this case, the radial dimension of each flange 61 is greater than the radial dimension of the end section of each pin portion 75 after swaging. Also, each bushing 60 is made of material that is unlikely to melt even if the end section of the corresponding pin portion 75 contacts the bushing 60 after having been heated to a high temperature through heat swaging.

Spin swaging, which is used to swage the end sections of the projecting portions 52, generates a greater amount of heat at the time of swaging than heat swaging, which is used to swage the end sections of the pin portions 75. Therefore, in the present embodiment, the spin swaging is used to thermally deform the end sections of the projecting portions 52, which are made of metal. On the other hand, the pin portions 75, which are made of plastic, have a melting temperature lower than the projecting portions 52, which are made of metal. Therefore, the spin swaging, which generates a great amount of heat, may melt not only the end sections but also the whole sections of the pin portions 75. As a result, the heat swaging, which generates a smaller amount of heat than the spin swaging, is used to swage the end sections of the pin portions 75.

The above described embodiment achieves the following advantages.

(1) The base portions 71 of the retainers 70 are fixed to the metal molding 50. The pin portions 75 of the retainers 70 are fixed to the corresponding retainer fixing portions 42. In these manners, the plastic molding 40, which has the retainer fixing portions 42, and the metal molding 50 are fixed to each other through the retainers 70. This allows fixation of the metal molding 50 and the plastic molding 40 by any method other than integral molding. That is, it is unnecessary to arrange the metal molding 50 in a metal mold for the plastic molding 40 in the step of manufacturing the rear quarter glass 400. As a result, unlike the conventional rear quarter glass manufactured by arranging a metal molding in a metal mold before molding a plastic molding, the decorative surface 51 of the metal molding 50 is free from scratches caused by contact between the metal molding 50 and the metal mold.

(2) A cast product is used as the metal molding 50. This increases flexibility of the outer appearance and shape design of the metal molding 50, compared to a metal molding formed by pressing a flat plate or the like. The design of the metal molding 50 is thus improved.

(3) In the conventional step of manufacturing rear quarter glass, a metal molding is arranged in a metal mold for a plastic molding before heated molten plastic is poured into the metal mold. The metal molding and the plastic molding are thus fixed to each other through integral molding. In this case, the metal molding arranged in the metal mold is heated by the heated plastic for a comparatively long time and thus tends to be heated to a high temperature. This may cause thermal distortion of the metal molding, thus deforming the metal molding. However, in the present embodiment, the metal molding 50 and the plastic molding 40 are fixed to each other not through integral molding. This restrains heating of the metal molding 50 to a high temperature by the molten plastic. As a result, deformation of the metal molding 50 caused by thermal distortion is restrained.

The projecting portions 52 of the metal molding 50 are subjected to swaging through thermal deformation. However, only limited sections of the metal molding 50 are heated by such swaging and heating is restricted to the projecting portions 52 and the proximities of the projecting portions 52. Also, the time for which the limited sections of the metal molding 50 are heated is extremely short compared to a case in which the metal molding 50 and the plastic molding 40 are fixed to each other through integral molding. As a result, despite the projecting portions 52 are swaged through thermal deformation, deformation of the metal molding 50 caused by thermal distortion is restrained.

(4) Each projecting portion 52 of the metal molding 50 may be swaged directly to the plastic molding 40 by spin swaging. However, in this case, if the end section of the projecting portion 52 that has been melted by the spin swaging contacts the plastic molding 40, the plastic molding 40 may melt and be damaged. In the present embodiment, the projecting portions 52 of the metal molding 50 are swaged to the retainers 70, not the plastic molding 40. This restrains melting damage of the plastic molding 40 caused by contact between the plastic molding 40 and the end section of the projecting portion 52 that has been melted through spin swaging.

(5) The pin portion 75 of each retainer 70 may be swaged directly to the plastic molding 40 by heat swaging. However, in this case, the end section of the pin portion 75 that has been melted by the heat swaging may contact the plastic molding 40, thus melting and damaging the plastic molding 40. In the present embodiment, the pin portion 75 of each retainer 70 is swaged not directly to the plastic molding 40 but to the flange 61 of the corresponding bushing 60, which is attached to the corresponding retainer fixing portion 42 of the plastic molding 40. This restrains melting damage of the plastic molding 40 caused by contact between the plastic molding 40 and the end section of the pin portion 75 that has been melted through heat swaging.

(6) When the end section of each projecting portion 52 of the metal molding 50 is swaged, the end section of the projecting portion 52 may melt and contact a plastic portion of the corresponding retainer 70, thus melting and damaging the plastic portion of the retainer 70. However, in the present embodiment, the end section of each projecting portion 52 is swaged to the corresponding metal plate 72. The melted end section of the projecting portion 52 thus contacts the metal plate 72, not the plastic portion of the retainer 70. In this manner, the sections of the plastic retainer 70 that contact the heated end sections of the corresponding projecting portions 52 are protected by the metal plates 72. This restrains melting damage of the retainer 70 caused by contact between the retainer 70 and the end section of the projecting portion 52 that has been melted by swaging.

(7) The end section of each projecting portion 52 may be swaged through plastic deformation, instead of thermal deformation. However, to plastically deform the end section of the projecting portion 52, great pressing force must be applied to the end section of the projecting portion 52. In this case, high pressure is applied to the sections of the metal molding 50 in which the projecting portions 52 are formed, compared to the sections other than the projecting portions 52. If high pressure is applied to limited sections of the metal molding 50, these sections may be deformed to distort the decorative surface 51. However, in the present embodiment, the end sections of the projecting portions 52 are thermally deformed and relatively small pressing force is applied to the projecting portions 52. The decorative surface 51 is thus unlikely to be distorted by swaging.

(8) The end sections of the pin portions 75 may be swaged through plastic deformation, instead of thermal deformation. However, to plastically deform the end section of each pin portion 75, high pressing force must be applied to the end section of the pin portion 75. In this case, when high pressing force is applied to the end section of the pin portion 75, the retainer 70 is pressed intensely against the back face 53 of the metal molding 50. This may deform the metal molding 50, thus distorting the decorative surface 51. However, in the present embodiment, the end section of each pin portion 75 is thermally deformed and relatively small pressing force is applied to the pin portion 75. The decorative surface 51 is thus unlikely to be distorted by swaging.

The above illustrated embodiment may be modified as follows.

As long as the projecting portions 52 are thermally deformable, heat swaging, instead of spin swaging, may be performed on the projecting portions 52. Alternatively, as long as melting of the entire section of each pin portion 75 is avoidable, spin swaging, instead of heat swaging, may be performed on the pin portions 75.

The end sections of the projecting portions 52 and the end sections of the pin portions 75 may be thermally deformed to be swaged and fixed using any method different from spin swaging or heat swaging.

The bushings 60 may be omitted and the pin portions 75 may be swaged directly to the retainer fixing portions 42. Also in this case, the above-described advantages other than the advantage (5) are ensured.

Instead of casting the metal plates 72 in each retainer 70, the metal plates 72 may each be adhered to the corresponding one of the surfaces of the base portion 71 located on the opposite sides of the seat portion 74.

The metal plates 72 may be omitted from each retainer 70. Also in this case, the above-described advantages other than the advantage (6) are ensured.

For each fixing position K, the number of the projecting portions 52 for fixing the metal molding 50 to the retainers 70 or the number of the pin portions 75 for fixing the plastic molding 40 to the retainers 70 may be changed as needed.

The shape of each retainer 70 may be changed as needed.

The rear quarter glass 400 may be openable to allow ventilation of the passenger compartment.

The molding structure of the present embodiment may be employed in, other than the rear quarter glass 400 of the vehicle, a front quarter glass 500, which is arranged in a front section of the vehicle side surface as shown in FIG. 1, a window shield glass 600, or a rear glass 700, which is arranged in a rear surface of the vehicle.

The invention claimed is:

1. A molding structure for automotive glass having a glass plate, the molding structure comprising:
   a plastic molding arranged along a peripheral edge of the glass plate through integral molding;
   a cast metal molding arranged in the plastic molding; and
   a retainer that is arranged between the plastic molding and the metal molding and fixed to the plastic molding and the metal molding, wherein
   the retainer includes a first through-hole,
   the metal molding has a projecting portion that is inserted through the first through-hole,
   the projecting portion has an end section that projects from the first through-hole in a state inserted through the first through-hole, and
   the end section of the projecting portion is swaged to the retainer by swaging through thermal deformation.

2. The molding structure according to claim 1, wherein
   the retainer has a rod-shaped pin portion,
   the plastic molding has a second through-hole through which the pin portion is inserted,
   the pin portion has an end section that projects from the second through-hole in a state inserted through the second through-hole, and
   the end section of the pin portion is swaged to the plastic molding by swaging through thermal deformation.

3. The molding structure according to claim 1, wherein
   a material of the retainer is a thermoplastic resin, and
   a metal plate to which the end section of the projecting portion is swaged is arranged on a surface of the retainer.

4. The molding structure according to claim 2, further comprising a bushing arranged in the plastic molding,
   wherein the bushing has the second through-hole through which the pin portion is inserted and a flange to which the end section of the pin portion is swaged.

5. The molding structure according to claim 1, wherein the end section of the projecting portion is swaged to the retainer by spin swaging.

6. The molding structure according to claim 2, wherein the end section of the pin portion is swaged to the plastic molding by heat swaging.

* * * * *